US006351656B1

(12) United States Patent
Burgan et al.

(10) Patent No.: US 6,351,656 B1
(45) **Date of Patent: *Feb. 26, 2002**

(54) METHOD AND APPARATUS FOR DISPLAYING A MESSAGE WHICH HAS BEEN RECEIVED

(75) Inventors: John M. Burgan, North Palm Beach; Kenneth S. Lerner, Boca Raton, both of FL (US)

(73) Assignee: Motorola, Inc., Schaumburg, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/924,261

(22) Filed: Sep. 5, 1997

(51) Int. Cl.[7] .................................................. H04B 7/00

(52) U.S. Cl. ....................... 455/566; 455/466; 340/7.51

(58) Field of Search ............................... 455/38.1, 38.4, 455/31.1, 67.7, 550, 566, 527, 528, 466; 329/355, 58; 340/825.41, 825.44, 825.45, 825.5; 713/340; D14/138

(56) References Cited

U.S. PATENT DOCUMENTS 3,596,389 A * 8/1971 Drueck .......................... 40/36
4,438,433 A * 3/1984 Smoot et al. ................. 455/31
4,490,579 A * 12/1984 Godoshian ................... 455/38
4,644,350 A * 2/1987 Ishii ...................... 340/825.44
4,788,546 A * 11/1988 Rubin ......................... 45/527
4,860,247 A * 8/1989 Chida et al. ................ 364/900
4,866,646 A * 9/1989 Nakamura et al. ...... 364/709.11
4,952,927 A * 8/1990 DeLuca et al. ........ 340/825.44
5,258,751 A * 11/1993 DeLuca et al. ........ 340/825.44
5,396,264 A * 3/1995 Falcone et al. ........ 340/825.44
5,430,436 A * 7/1995 Fennell .................. 340/825.44
D363,281 S * 10/1995 Buhrmann ................. D14/138
5,473,143 A * 12/1995 Vak et al. ................... 235/980
5,473,667 A * 12/1995 Neustein ................ 340/825.44
5,495,517 A * 2/1996 Ide et al. ................... 455/38.4
5,687,216 A * 11/1997 Svensson ..................... 379/58
5,870,682 A * 2/1999 Miwa et al. ................ 455/566
5,875,403 A * 2/1999 Christal ...................... 455/566
5,892,455 A * 4/1999 Maatsumoto .......... 340/825.44
5,923,845 A * 7/1999 Kamiya et al. ........ 395/200.36
5,926,770 A * 7/1999 Nishiyama .................. 455/566
5,930,517 A * 7/1999 Diehl et al. ................. 713/340
5,966,663 A * 10/1999 Gleason ...................... 455/466
6,002,918 A * 12/1999 Heiman et al. ............. 455/566

OTHER PUBLICATIONS

"Advisor Gold Flx User's Guide" by Motorola, Inc., Document Number 6881024B55–A, Jun. 1995.

* cited by examiner

*Primary Examiner*—Lester G. Kincaid
(74) *Attorney, Agent, or Firm*—Randi L. Dulaney

(57) ABSTRACT

A communication device such as pager (100) includes a controller (110) which decodes an incoming high priority message (402) and stores it in memory (112). A user control (116) such as a "Read" control switch is then used to present at least a portion of the high priority message on a display (106). Once the high priority message has been read, the message data of the high priority message is persistently presented on display until a user decides to delete the message. Depending on the size of the display, a portion or all of the message data is presented. If the display is too small to accommodate at one time all message data of a high priority message, portions of the message data of the high priority message are displayed for a predetermined period on a rotating basis. If there are more than one high priority message that are to be persistently displayed, each high priority message is displayed for a predetermined period on a rotating basis.

6 Claims, 3 Drawing Sheets

METHOD AND APPARATUS FOR DISPLAYING A MESSAGE WHICH HAS BEEN RECEIVED

FIELD OF THE INVENTION

This invention relates in general to electronic devices and in particular to communication devices which have a display.

BACKGROUND OF THE INVENTION

Communication devices such as pagers using present day technology have the capability of giving an alert if a priority or emergency message is received by the pager. For example, a paging feature such as, Priority Override Page, will prioritize an incoming priority page by informing an individual with an audible alert, regardless if his/her pager is set on vibrate or silent mode of operation. For a specific and illustrative example of pagers that provide such priority page override capability, one may refer to U.S. Pat. No. 4,438,433, granted to Smoot, et al., entitled "Multiaddress Pager with a Call Storage and Priority Page Option", and assigned to the present assignee.

Once a high priority message is received at the pager, even when using a feature such as the priority override page, the high priority message is displayed, if the pager is equipped with a display, using the same technique used for a normal or non-priority message. Messages are retrieved by pressing the "Read" key on the pager and scrolling through the received messages that are stored in the pager's message buffer. Normally, once a message has been read, the message stored in the pager can be deleted in order to make room for new messages.

There is currently however no way to maintain the importance of a high priority message after an individual has recalled the stored message(s) from the pager's memory message buffer using the "Read" key (or some other pager control switch used for such functions). In situations where an important or high priority page is received and can't be acted upon by an individual for some time (e.g., a few hours) after the message has been read (e.g., individual is preoccupied with some important matter at the time, etc.), he may forget about the message over time. A need thus exists in the art for a method and apparatus which can provide an enhanced alert feature for users of communication devices such as pagers when a priority message is received.

DESCRIPTION OF THE PREFERRED EMBODIMENT

Figure 1:
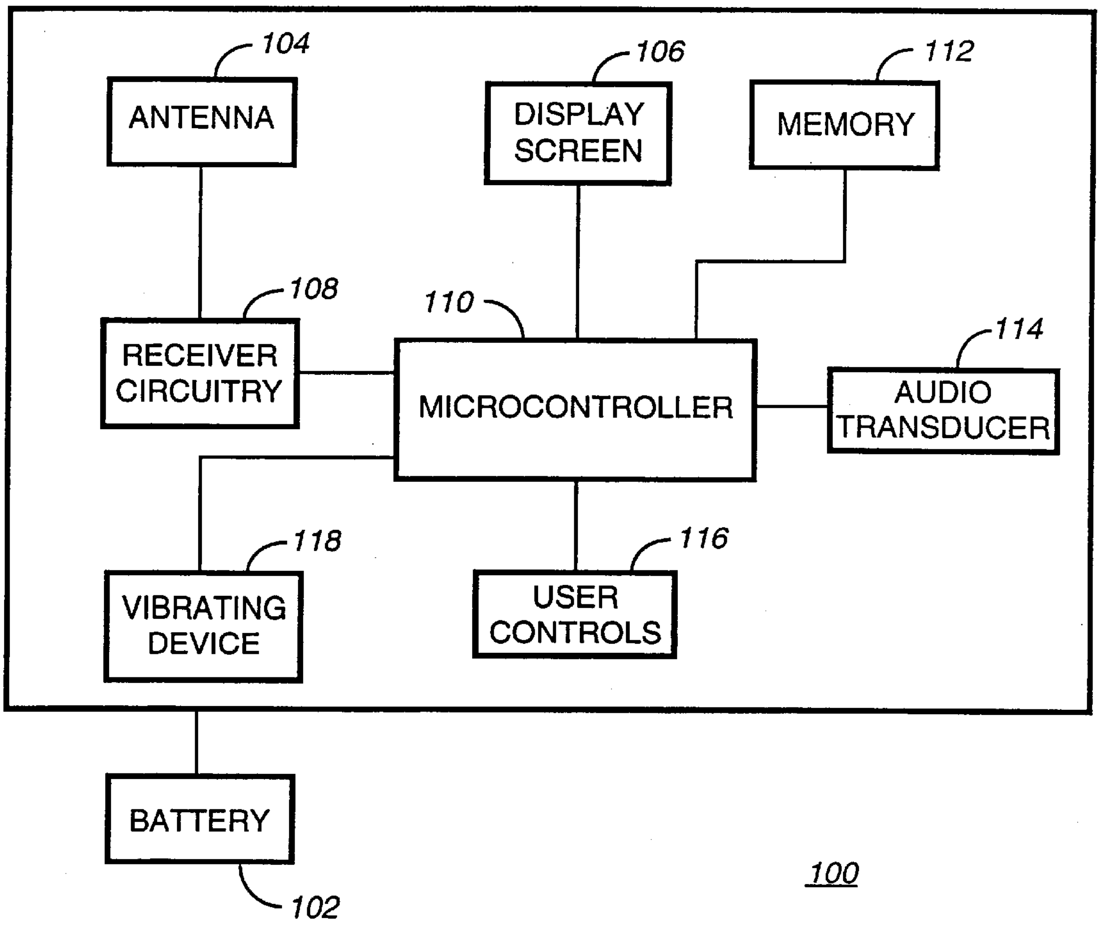
FIG. 1 shows a block diagram of a pager in accordance with the preferred embodiment of the invention.

Referring now to the drawings and in particular to FIG. 1, a simplified block diagram of a selective call receiver 100 such as a pager in accordance with the invention is shown. Pager 100 includes a primary power supply 102 which can preferably take the form of a nonrechargeable battery, such an alkaline battery, or a rechargeable battery, such as a nickel-cadmium (NiCd) battery. Battery 102 provides power to all of the pager's circuitry. The pager 100 further comprises an antenna 104 that receives a radio frequency (RF) modulated selective call signal and provides the signal to a conventional receiver circuitry 108 for demodulation thereby. A microcontroller or microprocessor 110 processes the demodulated signal to decode an address and optional message data contain therein.

Once recovered, the message data may be stored in the memory or storage area 112 (message buffer) for subsequent presentation by an output device, such as a liquid crystal display 106 or an alert mechanism. In normal operation, the pager's controller 110 compares a decoded address contained in the received signal with a predetermined addresses stored in memory to determine if the message is for that particular pager. The user is alerted by an alert mechanism that a message has been received if the decoded address correlates with one of the predetermined address or addresses. The alert mechanism typically takes the form of an audio transducer 114, etc. If the pager 100 is set to Silent mode, no audible alert will be given upon receipt of the message data unless a Priority Override Page is received as mentioned previously. Alternatively, the pager 100 can vibrate instead of sounding an audible alarm upon receipt of an incoming message if equipped with a vibrating device 118. If the received signal contains optional message data, the display 106 will present the message automatically on the display or when manually selected, by user actuated controls 116 which comprise switches, etc.

Figure 2:
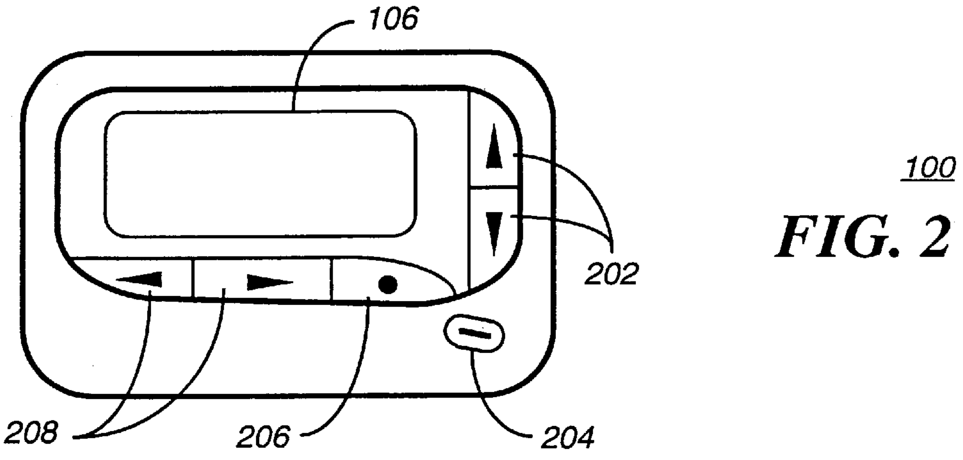
FIG. 2 shows a front of a pager showing the pager's display and controls in accordance with the preferred embodiment of the invention.
Figure 3:
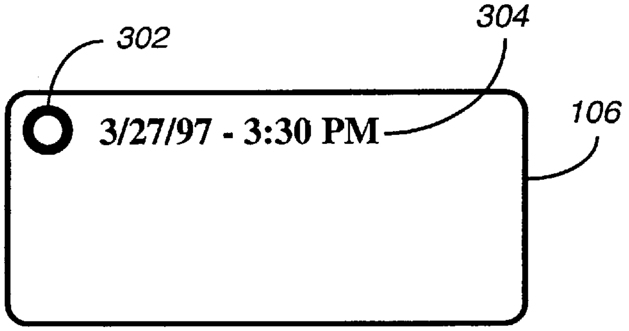
FIG. 3 PRIOR ART
FIG. 3 shows a prior art standby screen pager display.

In FIG. 2, a front view of pager 100 is shown. In the particular pager shown, the user controls 116 include left/right directional buttons 208, up/down directional buttons 202, a read/reset/power on button 204, and a function/select button. The user controls 116 allows the pager user to set all of the pager's user selectable features and functions, and allows the user to review and delete the messages which have been received. Referring now to FIG. 3, a standard standby display for pager 100 is highlighted. LCD display screen 106 in the standard standby mode displays the time and date 304 and a "power on" icon 302.

Priority messages such as important or emergency messages which are received by the communication devices of the present invention can be transmitted using conventional methods for designating priority messages as known in the art. For example, in paging systems, a priority page may be sent using the previously mentioned Priority Override Page feature. The designation of the importance of the message can be attached to a transmitted message by the sender of the message using one of many techniques known in the art. For example, the importance of a message can be tagged by the sender of the message by calling a special phone number in order to send the page via the paging system, by performing a certain keypress sequence when entering the page via a telephone handset, by notifying the paging terminal operator entering the page into the paging system that the message is important so that it may be tagged accordingly, etc. That which determines whether a message is an emergency (priority) message or non-emergency message in one preferred implementation of the invention may be what is stored in the pager's code plug or read-only memory (ROM), which in pager 100, is located "on-chip" to microcontroller 110. As an example, a controller such as the MC68HC05L16 manufactured by Motorola, Inc. includes 16 Kilobytes of user ROM and 512 bytes of RAM on board the microcontroller. The ROM may have several addresses, for example, 739–3444, may be reserved for priority messages, and two other addresses, for example, 739–3445 and 739–3446, may be reserved for non-priority messages data. Besides using multi-addresses to determine which messages are priority messages and which are not, one could use one or more bits which are part of the incoming message (paging protocol) to notify the pager 100 that the message should be treated as a priority message, etc.

Figure 4:
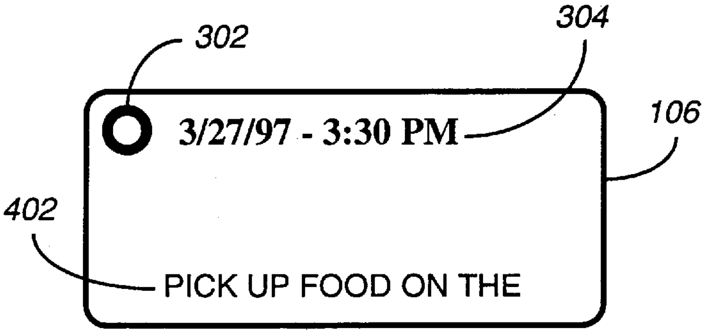
FIG. 4 shows a persistent message display on a pager standby screen in accordance with the preferred embodiment of the invention.
Figure 5:
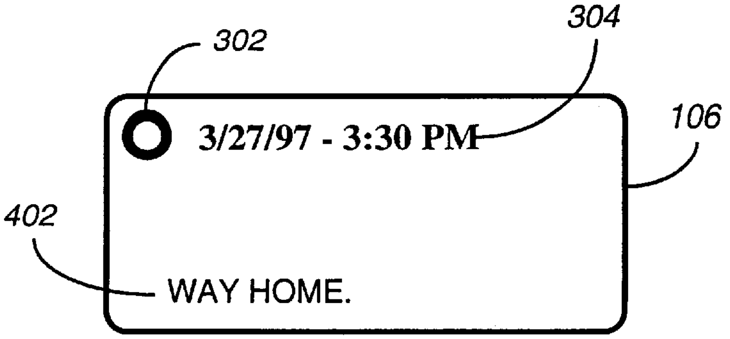
FIG. 5 shows a continuation display screen of the persistent message shown in FIG. 4.
Figure 6:
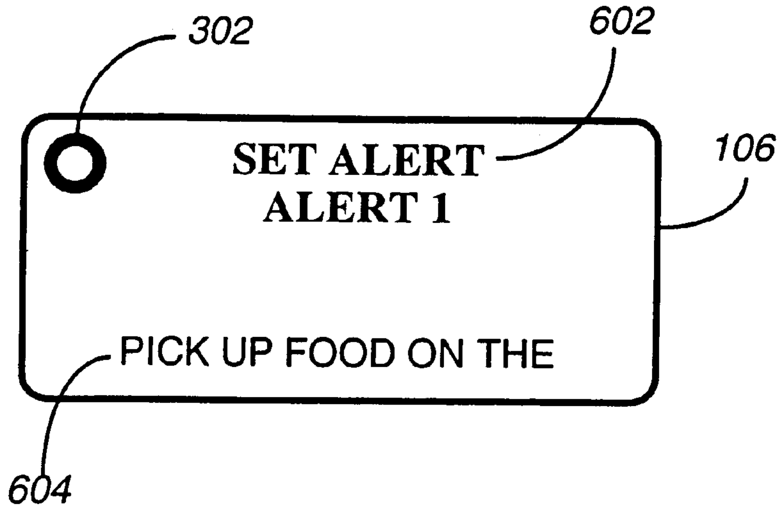
FIG. 6 shows a persistent message display on a typical function screen of a pager in accordance with the invention.

In accordance with the present invention once a message is decoded as an important or priority message by the pager, and read by the user, the message will remain persistently on the display to remind the user of the message whenever he looks at his pager's display. As one example, on a pager with an eight line display, a portion of a received message or an entire page message designated as high priority may occupy the bottom line of the display at least periodically as shown in FIG. 4, until the message is deleted from the pager by the user. Preferably, the persistent page message pick up food on the would be visible even when the remainder of the display screen is in standby mode as shown in FIG. 4., or when the display is used for other functions (e.g., setting the pager's real-time clock, selecting the pager's audio tone 602, etc.) as shown in FIG. 6. In FIG. 6, a persistent message is shown occurring during a function display screen which sets the alert functions on pager 100. Since the high priority message shown in FIG. 4 is too long to be displayed in one line, in FIG. 5, the remainder of the message as provided to the user is shown. A first portion and the remainder of the high priority message shown on the display screens in FIG. 4 and FIG. 5, respectively are preferably shown in alternating fashion so the user can read the whole message. Alternatively, only the first portion of a message could be displayed as shown in FIG. 4 with the user being required to press a control switch to view the balance of the message.

On pagers with smaller display screens, or in cases where more "persistent" pages exist in the pager's memory than the pager's display area can handle, the persistent page messages would be preferably presented on the display screen on a rotating basis or in some other alternating fashion. Preferably, in the situation where the display can't handle the presentation of all of the important messages 604 and 704, each of the persistent messages would be displayed for a predetermined period of time, and so on, in a periodic fashion along with the pager's standby or other display screens see FIGS. 6 and 7. This would allow pagers with limited display resources, such as pagers with one line display screens, to still use the persistent display feature of the present invention.

Figure 7:
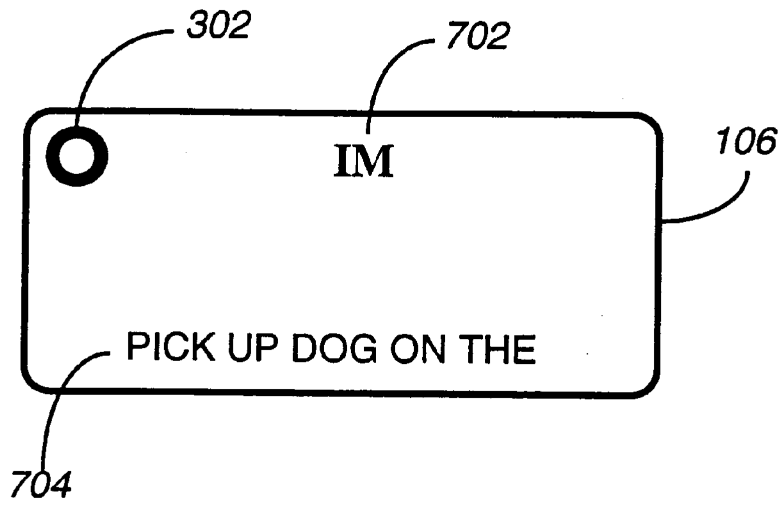
FIG. 7 shows an icon or display symbol which can be used in accordance with one of the preferred embodiments of the invention.

On a pager having a one line display screen for example, the persistent page message could be alternated on the display with the time of day which is normally shown on the one line pager's standby screen. As a further enhancement to the present invention, a further type of notification can be given to the user that a persistent message is being displayed. As an example, a special icon or display symbol can be displayed on the screen which notifies the pager user that a persistent message is being displayed. This is particularly useful in the case of a one line display pager. In this particular case, some type of notification (e.g., icon) would be necessary to distinguish between a persistent message being displayed and a conventional reading from the pager's message buffer of a normal or non-priority message. In FIG. 7, an icon or display symbol "IM" 702 (which equates in this example to "Important Message") is used to alert the user that the message being displayed is an important message. In alternating display situations, as referred to previously above in which the priority message or a portion of the message can not be displayed on a full-time basis, icon 702 can be useful in letting the communication device user know that an important or priority message has been received.

Due to the limitations of pager's having smaller displays (e.g., one line display areas), the pager's user interface routine may need to temporarily override the persistent display of an important message as provided by the present invention during operations requiring the full display of the pager. For example, it may be preferable to only display the persistent message on the standby screen of the pager, and not when a user of a one line display pager is reading from the pager's message buffer other received messages (e.g., non-priority messages, etc.). As mentioned above, in this situation the icon 702 could be used to indicate the presence of a persistent page message when the display on a one line pager is being used to read other received messages.

In the present invention, high priority messages (e.g., important or emergency pages) sent to a communication device such as pager 100 will be persistently displayed in a designated area of the pager's display screen 106. This allows the user of a communication device such as a pager, cellular telephone, etc. a chance to recall an important message that may need to be acted upon latter in the day. By looking at the communication device's screen, which is typically done by most users several times during the day, the important message is easily remembered. As mentioned above, the term "persistently" as used in the present invention does not mean that the important message or a portion of the message is displayed at all times on the display. The important message may be displayed on a periodic basis as for example discussed above in association with one line display pagers, etc. Of course, if the communication device's display can accommodate one or more important message, these can be displayed on a continuous basis if so desired.

Preferably, the persistent display feature of the present invention can be turned on or off by the user of the communication device by activating a predetermined set of user controls 116. As for example done to set the pager's real-time clock or other pager features (e.g., alert tones, etc.). Alternatively, the persistent display feature can be set in ROM. The software algorithm required to perform the persistent message display feature of the present invention is preferably stored in the on-chip ROM found in controller 110. In other designs, the software algorithm can be stored in external storage areas as known in the art (e.g., external ROM, etc.).

While the preferred embodiments of the invention have been illustrated and described, it will be clear that changes, variations, substitutions and equivalents will occur to those skilled in the art without departing from the spirit and scope of the present invention as defined by the appended claims.

What is claimed is:

1. A method at a battery-powered communications device for presenting messages on a display of the communication device after reception of the messages at the communication device, including at least one message pre-designated by a sender of the message prior to reception of the message at the communication device as a high priority message, the messages including message data, the device having a user control, the display also for presenting other function information, comprising the steps of:

(a) presenting on the display message data of one message of the messages in response to activating the user control; and (b) activating the user control to present on the display other function information, and in response thereto, presenting on the display both the other function information and at least a portion of the message data of the one message of step (a) if the one message of step (a) was pre-designated a high priority message by the sender of the one message prior to reception of the one message at the communication device, otherwise presenting on the display the other function information and none of the message data of the one message of step (a).

2. A method for presenting messages on a display of a communication device after reception of the messages at the communication device, including at least one message pre-designated prior to reception of the message at the communication device as a high priority message, the messages including message data, the device having a user control, comprising the steps of:

presenting on the display message data of a first message in response to activating the user control; and activating the user control to present on the display message data of a second message, and in response thereto, presenting on the display both at least a portion of the message data of the second message and at least a portion of the message data of the first message if the first message was pre-designated a high priority message by the sender of the first message prior to reception of the first message at the communication device, otherwise presenting on the display at least a portion of the message data of the second message and none of the message data of the first message.

3. In a communication device having a display for presenting message data of messages received by the communication device, a method of presenting the messages on the display, comprising the steps of:

(a) receiving a high priority message, the high priority message having been pre-designated by a sender of the high priority message as a high priority message prior to being received by the communication device;

(b) presenting the high priority message;

(c) designating the high priority message as having been read by the user of the communication device;

(d) dividing the message data of the high priority into a plurality of portions; and (e) presenting the message data of the high priority message in a persistent manner after the high priority message had been designated by the user of the communication device as having been read by the user by repeatedly presenting the portions in an alternating fashion so that the user can read the whole high priority message.

4. The method of claim 3, including, subsequent to step (e), the step of:

(f) stopping the presenting of step (e) in response to the user deleting the high priority message.

5. In a communication device having a display for presenting message data of a plurality of messages received by the communication device, at least two messages of the plurality of messages having been pre-designated by a sender of the at least two messages as high priority messages prior to being received by the communication device, a method of presenting the plurality of messages on the display, comprising the steps of:

(a) presenting at least a portion of the message data of a first high priority message in a persistent manner after the first high priority message had been designated by a user of the communication device as having been read by the user of the communication device;

(b) presenting another high priority message;

(c) designating the another high priority message as having been read;

(d) subsequent to step (c), removing from the display the at least a portion of the message data of the first high priority message and presenting in its place for only a predetermined period of time at least a portion of the message data of the other high priority message; and (e) at the end of the predetermined period of time, removing from the display the at least a portion of the message data of the other high priority message and presenting for only the predetermined period of time at least a portion of the message data of the first high priority message.

6. The method of claim 5, including, subsequent to step (e), the step of:

(f) repeating steps (d) and (e) until at least one of the high priority message and the other high priority message is deleted by the user of the communication device.

* * * * *